(12) United States Patent
Suzuki et al.

(10) Patent No.: US 6,317,194 B1
(45) Date of Patent: Nov. 13, 2001

(54) IMAGE READING APPARATUS, IMAGE PROCESSING SYSTEM, IMAGE READING METHOD, AND IMAGE PROCESSING METHOD

(75) Inventors: Kenji Suzuki; Yoshio Ozawa; Hideo Ishizaka, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/390,291

(22) Filed: Sep. 3, 1999

(30) Foreign Application Priority Data

Sep. 7, 1998 (JP) .................................................. 10-252477

(51) Int. Cl.[7] .......................... G03B 27/52; G03B 37/32; G03B 29/00; G03B 1/52; G03B 1/00
(52) U.S. Cl. .................................. 355/41; 355/27; 355/28; 355/29; 355/40; 355/407; 352/159; 352/166; 352/180; 352/184
(58) Field of Search ...................... 355/41, 27, 28, 355/29, 40, 407; 352/159, 166, 180, 184

(56) References Cited

U.S. PATENT DOCUMENTS

| | | | |
|---|---|---|---|
| 5,162,842 | * 11/1992 | Shiota | 355/40 |
| 5,432,580 | * 7/1995 | Tokuda | 354/298 |
| 5,475,493 | * 12/1995 | Yamana | 355/77 |
| 5,488,450 | * 1/1996 | Tanibata | 355/38 |
| 5,734,460 | * 3/1998 | Nakaoka et al. | 355/29 |
| 5,841,518 | * 11/1998 | Kajiwara | 355/40 |
| 5,867,252 | * 2/1999 | Tanibata | 355/38 |
| 5,892,571 | * 4/1999 | Yamanoto | 355/27 |

FOREIGN PATENT DOCUMENTS

| | | | |
|---|---|---|---|
| 8-304932 | 11/1996 | (JP) | G03B/27/46 |
| 8-304933 | 11/1996 | (JP) | G03B/27/46 |
| 8-304934 | 11/1996 | (JP) | G03B/27/46 |
| 8-304935 | 11/1996 | (JP) | G03B/27/46 |

* cited by examiner

Primary Examiner—Russell Adams
Assistant Examiner—Khaled Brown
(74) Attorney, Agent, or Firm—Sughrue, Mion, Zinn, Macpeak & Seas, PLLC

(57) ABSTRACT

A loop region in which a loop of a negative film is formed is provided between a pre-scan section and a fine scan section. When a frame image recorded on the negative film is read, a control circuit effects control such that respective processings in the pre-scan section and the fine scan section are performed concurrently in a state in which a length of the loop in the loop region is within a predetermined allowable range.

21 Claims, 12 Drawing Sheets

FIG. 1
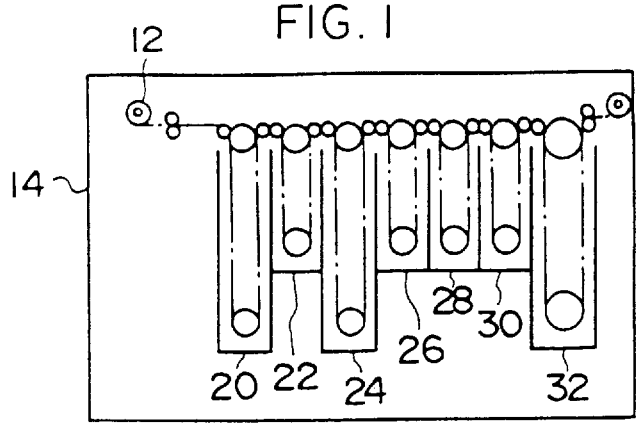
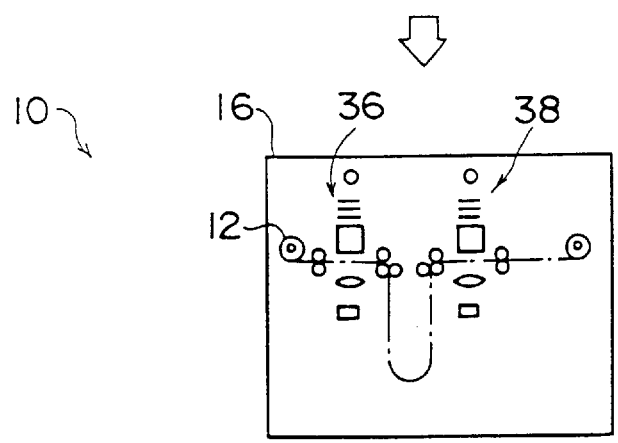
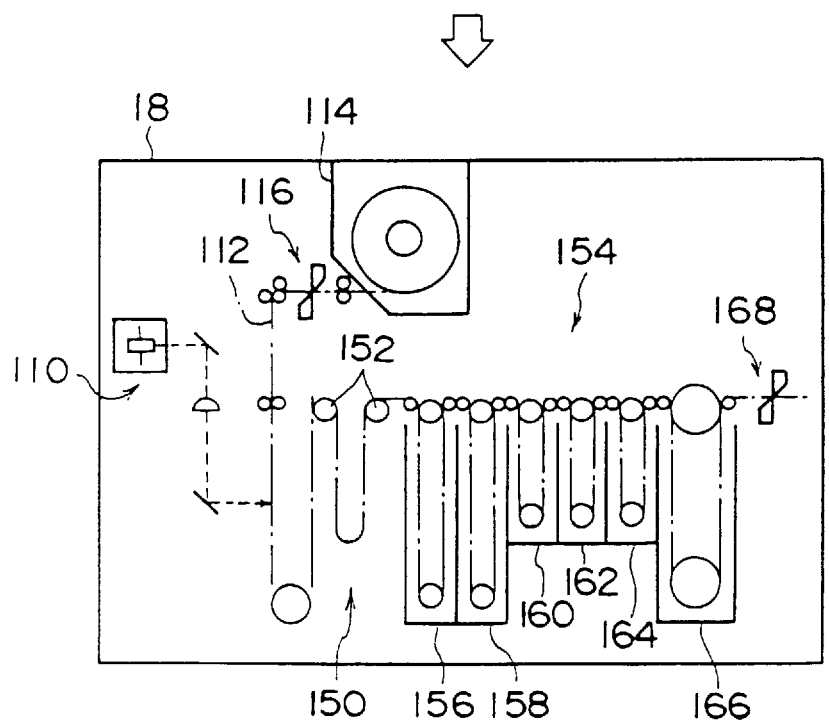

IMAGE READING APPARATUS, IMAGE PROCESSING SYSTEM, IMAGE READING METHOD, AND IMAGE PROCESSING METHOD

BACKGROUND OF THE INVENTION

1. Field of the Invention

The present invention relates to an image reading apparatus, an image processing system, an image reading method, and an image processing method. More particularly, the present invention relates to an image reading apparatus, an image processing system, an image reading method, and an image processing method in which images recorded on a photographic photosensitive material are read.

2. Description of the Related Art

In some conventional laboratory systems in which images recorded on a photographic photosensitive material (hereinafter referred to merely as a photographic film) such as a photographic film are processed, first, preliminary reading (hereinafter referred to as pre-scan) in which an image is read at a relatively high speed and with low precision is carried out. Based on image data obtained by the pre-scan, photometric conditions for a main scan (hereinafter referred to as fine scan), in which an image is read at a relatively low speed and with high precision, and processing conditions of image processings for image data to be obtained by the fine scan are determined. Further, fine scan is performed based on the determined photometric conditions, and image processings are carried out, based on the determined processing conditions, on the image data obtained by the fine scan.

In some image reading apparatuses used for reading images recorded on a photographic film in this type of laboratory system, two photometric systems each having a CCD sensor for reading an image are provided for the purpose of achieving high speed image reading processing. By performing pre-scan and fine scan using these different photometric systems, pre-scan and fine scan are performed concurrently.

However, the above-described image reading apparatus having two photometric systems has a drawback in that, when pre-scan and fine scan are performed at different processing speeds, the processing speed of the one scan performed at the higher speed needs to be made to correspond to the processing speed of the other scan performed at the lower speed, thereby causing the overall image-reading speed to be low. This drawback will be described below more concretely.

Namely, as described above, since pre-scan is generally performed to read images at a relatively high speed and with low precision, the speed at which an image is read by the pre-scan is higher than that of the fine scan in which an image is read at a relatively low speed and with high precision.

On the other hand, in a case in which, after pre-scan, photometric conditions, for the fine scanning on the basis of the data obtained by pre-scan, and processing conditions, of the image processings on the image data obtained by fine scanning, are determined, time for determining the conditions is required. In this case, the processing time for pre-scan is the sum of the image reading time and the time required for the aforementioned determination. When the processing time for pre-scan is different from that for fine scan, the processing time for the scan performed at the faster speed needs to be made to correspond to the processing time for the scan performed at the lower speed, thereby causing the overall image-reading speed to be low.

SUMMARY OF THE INVENTION

The present invention has been devised in order to solve the above-described drawback, and an object thereof is to provide an image reading method and apparatus which allow reading of images at a high speed.

In order to achieve the above-described object, there is provided an image reading apparatus according to a first aspect of a first invention, which comprises: a conveying device for conveying a photographic photosensitive material on which an image is recorded so that the image passes sequentially through a first reading position and a second reading position; a first photometric system which reads the image at the first reading position and outputs the image as image data; a second photometric system which reads the image at the second reading position under photometric conditions determined on the basis of image data outputted from the first photometric system, and outputs the image as image data; a loop region provided on a conveying path along which the photographic photosensitive material is conveyed by the conveying device and between the first photometric system and the second photometric system, the loop region being provided to form a loop in the photographic photosensitive material; and a control device which effects control such that the first photometric system and the second photometric system operate independently in a state in which the length of the loop of the photographic photosensitive material in the loop region is within a predetermined range.

According to the image reading apparatus of the first aspect, the photographic photosensitive material on which an image is recorded is conveyed by the conveying device so that the image passes sequentially through the first reading position and the second reading position.

Further, the image is read at the first reading position and outputted as image data by the first photometric system, and under a photometric condition determined based on image data outputted from the first photometric system, the image is read at the second reading position and outputted as image data by the second photometric system.

Here, during the above-described image reading by the first photometric system and the second photometric system, in the loop region provided on the conveying path of the photographic photosensitive material and between the first photometric system and the second photometric system and further provided to form the loop in the photographic photosensitive material, the control device is provided to control so that the first and second photometric systems operate independently in the state in which the length of the loop of the photographic photosensitive material is set within a predetermined range.

The loop formed in the photographic photosensitive material in the aforementioned loop region can function to eliminate a difference in the processing speed between the first and second photometric systems in the state in which the length of the loop is set within the predetermined range. Accordingly, as described above, generally, a speed at which an image is read at pre-scan is higher than that at fine scan. For this reason, when the pre-scan is performed by the first photometric system of the present invention and the fine scan is performed by the second photometric system of the present invention, the first and second photometric systems can be provided to operate independently in the state in which the length of the loop is set within the predetermined range.

Namely, in the image reading apparatus of the first aspect, the loop region is provided between the first and second photometric systems so as to eliminate the difference in the processing speed between these photometric systems, and therefore, respective operations of the first and second photometric systems can be performed independently and the time the operation of one of the photometric systems is stopped due to reasons of another one can be reduced. As a result, an image reading cycle (that is, a cycle at which an image is read for each image, which shall apply hereinafter) can be shortened and the speed at which an image is read can be made higher.

Further, an image reading apparatus of a second aspect is characterized in that, in the image reading apparatus of the first aspect, the control device detects a predetermined mark on the photographic photosensitive material at a starting end portion of the loop region, and thereafter, detects the predetermined mark at a terminal end portion of the loop region to thereby obtain an amount by which the photographic photosensitive material is conveyed from the starting end portion to the terminal end portion, and based on the amount by which the photographic photosensitive material is conveyed, the control device detects a length of the loop of the photographic photosensitive material in the loop region.

In the image reading apparatus of the second aspect, the control device in the image reading apparatus of the first aspect detects the predetermined mark on the photographic photosensitive material at the starting end portion of the loop region, and thereafter, detects the predetermined mark air the terminal end portion of the loop region to thereby obtain the amount by which the photographic photosensitive material is conveyed from the starting end portion to the terminal end portion, and based on the amount by which the photographic photosensitive material is conveyed, the length of the loop of the photographic photosensitive material in the loop region is detected.

As described above, according to the image reading apparatus of the second aspect, after the predetermined mark on the photographic photosensitive material has been detected at the starting end portion of the loop region, the predetermined mark is detected at the terminal end portion of the loop region, and the amount by which the photographic photosensitive material is conveyed from the starting end portion to the terminal end portion is thereby obtained. Further, based on the amount by which the photographic photosensitive material is conveyed, the length of the loop formed in the photographic photosensitive material in the loop region is detected. Accordingly, as compared with a case in which the loop length is directly detected using a sensor or the like, the loop length can be detected reliably and precisely.

In a third aspect of the present invention, a splice tape used to connect a plurality of photographic photosensitive materials can be used as the predetermined mark in the image reading apparatus of the second aspect.

Further, an image reading apparatus of a fourth aspect is characterized in that, in the image reading apparatus according to the first aspect, on the basis of the image data outputted from the first photometric system, the control device performs at least one of detection of a position of the image, detection of a size of the image, detection of a DX code when a DX code is applied to the photographic photosensitive material, detection of a frame number when a frame number is given to the photographic photosensitive material, a determination as to whether the image is an undesired image, a determination of photometric conditions under which the second photometric system reads the image, a determination of processing conditions of image processing for image data outputted from the second photometric system, and image inspection.

According to the image reading apparatus of the fourth aspect, based on the image data outputted from the first photometric system, at least one of detection of a position of the image, detection of a size of the image, detection of a DX code when the DX code is given to the photographic photosensitive material, detection of a frame number when the frame number is given to the photographic photosensitive material, a determination as to whether the image is an undesired image, a determination of a photometric condition by the second photometric system, a determination of a processing condition of image processing for image data outputted from the second photometric system, and image inspection is performed by the control device in the image reading apparatus according to the first aspect.

Accordingly, for example, when the position and size of an image are detected based on the image data outputted from the first photometric system, a photometric region in the second photometric system can be previously determined.

The aforementioned DX code is a code indicating a manufacturer and sensitivity of a photographic photosensitive material, and is generally used widely. Examples of the aforementioned undesired image include an image in which focusing is not made on a main subject in an image (that is, a so-called unfocused image), and an ultra-overexposed or ultra-underexposed image in which a state of a main subject cannot be recognized. Further, the processing condition of image processing includes an enlargement/reduction ratio of an image, a processing condition of image processing for hyper-tone or hyper-sharpness, a gradation conversion condition, and the like. Moreover, the aforementioned image inspection allows inspection of image data by causing an image to be displayed on display means such as a CRT display using image data and by an operator or the like referring to the displayed image.

As a result, the image reading apparatus of the fourth aspect has similar effects to those of the first to third aspects, and further, based on the image data obtained by the first photometric system, at least one of detection of a position of the image, detection of a size of the image, detection of the DX code, detection of the frame number, a determination as to whether the image is an undesired image, a determination of a photometric condition by the second photometric system, a determination of a processing condition of image processing for image data outputted from the second photometric system, and image inspection is performed. Accordingly, prior to the image reading by the second photometric system, various information which can be utilized in the image reading can be obtained, and by utilizing the various information, high-speed and high-quality image reading processing can be achieved.

Further, according to the image reading apparatus of the fourth aspect, the frame number and the DX code are detected based on the image data obtained by the first photometric system, and therefore, a mechanism such as a sensor for detecting the frame number of the DX code is not required and the cost of the apparatus can be reduced.

An image reading apparatus of a fifth aspect is characterized in that, in the image reading apparatus of the fourth aspect, when the control device carries out at least one of the determination of photometric conditions under which the second photometric system reads the image and the image inspection, the control device uses the image data outputted from the first photometric system, which has been converted such that characteristics of the image data outputted from the first photometric system become substantially identical to characteristics of the image data outputted from the second photometric system.

According to the image reading apparatus of the fifth aspect, when at least one of the determination of the photometric condition by the second photometric system and the image inspection is performed by the control device in the image reading apparatus of the fourth aspect, the image data outputted from the first photometric system is used in such a manner as to be converted so that characteristics of the image data outputted from the first photometric system become substantially identical to those of image data outputted from the second photometric system.

As described above, the image reading apparatus of the fifth aspect has similar effects to those of the fourth aspect, and when at least one of the determination of the photometric condition by the second photometric system and the image inspection is performed, the image data outputted from the second photometric system is used in such a manner as to be converted so that characteristics of the image data outputted from the first photometric system become substantially identical to those of the image data outputted from the second photometric system. Accordingly, the determination of the photometric condition by the second photometric system and the image inspection can be performed precisely using the image data whose characteristics are substantially identical to those of the image data outputted from the second photometric system.

In a sixth aspect of the present invention, the conversion in the image reading apparatus of the fifth aspect can be made by a look-up table or a matrix calculation.

Further, an image reading apparatus of a seventh aspect is characterized in that, in the image reading apparatus according to the fourth aspect, in a case in which the control device makes a determination as to whether the image is an undesired image on the basis of the image data outputted from the first photometric system and the control device determines that the image is an undesired image, the control device effects control so as not to allow reading of the image by the second photometric system.

According to the image reading apparatus of the seventh aspect, a determination as to whether an image is an undesired one is made by the control device in the image reading apparatus according to the fourth aspect based on the image data outputted from the first photometric system, and when it is determined that the image is an undesired one, reading of the image by the second photometric system is controlled so as not to be performed.

As described above, the image reading apparatus of the seventh aspect has similar effects to those of the fourth to sixth aspects, and further, when the image to be read is an undesired one, reading of the image by the second photometric system is provided so as not to be performed, thereby resulting in that an overall speed at which an image is read can be made higher.

In accordance with a first aspect of a second invention, there is provided an image reading method in which a photographic photosensitive material on which an image is recorded is conveyed so that the image passes sequentially through a first reading position and a second reading position; and when image reading for determining photometric conditions in a second photometric system is performed at the first reading position by a first photometric system, and image reading based on the photometric conditions is performed by the second photometric system at the second reading position, a loop is formed in the photographic photosensitive material on a conveying path of the photographic photosensitive material and between the first photometric system and the second photometric system, and the first and second photometric systems are controlled so as to operate independently in a state in which the length of the loop is within a predetermined range.

As described above, in the image reading method according to the first aspect of the second invention, the loop is formed between the first photometric system and the second photometric system so as to eliminate a difference in the processing speed between these photometric systems, and therefore, in the same way as in the first invention, respective operations of the first and second photometric systems can be performed independently. Further, the time period when the operation of one of the photometric systems is stopped due to reasons of another system can be reduced, and as a result, the image reading cycle can be shortened and the speed at which an image is read can be made higher.

BRIEF DESCRIPTION OF THE DRAWINGS

FIG. 1 is a schematic structural diagram of a photographic processing system according to an embodiment of the present invention.

DESCRIPTION OF THE PREFERRED EMBODIMENTS

Figure 2:
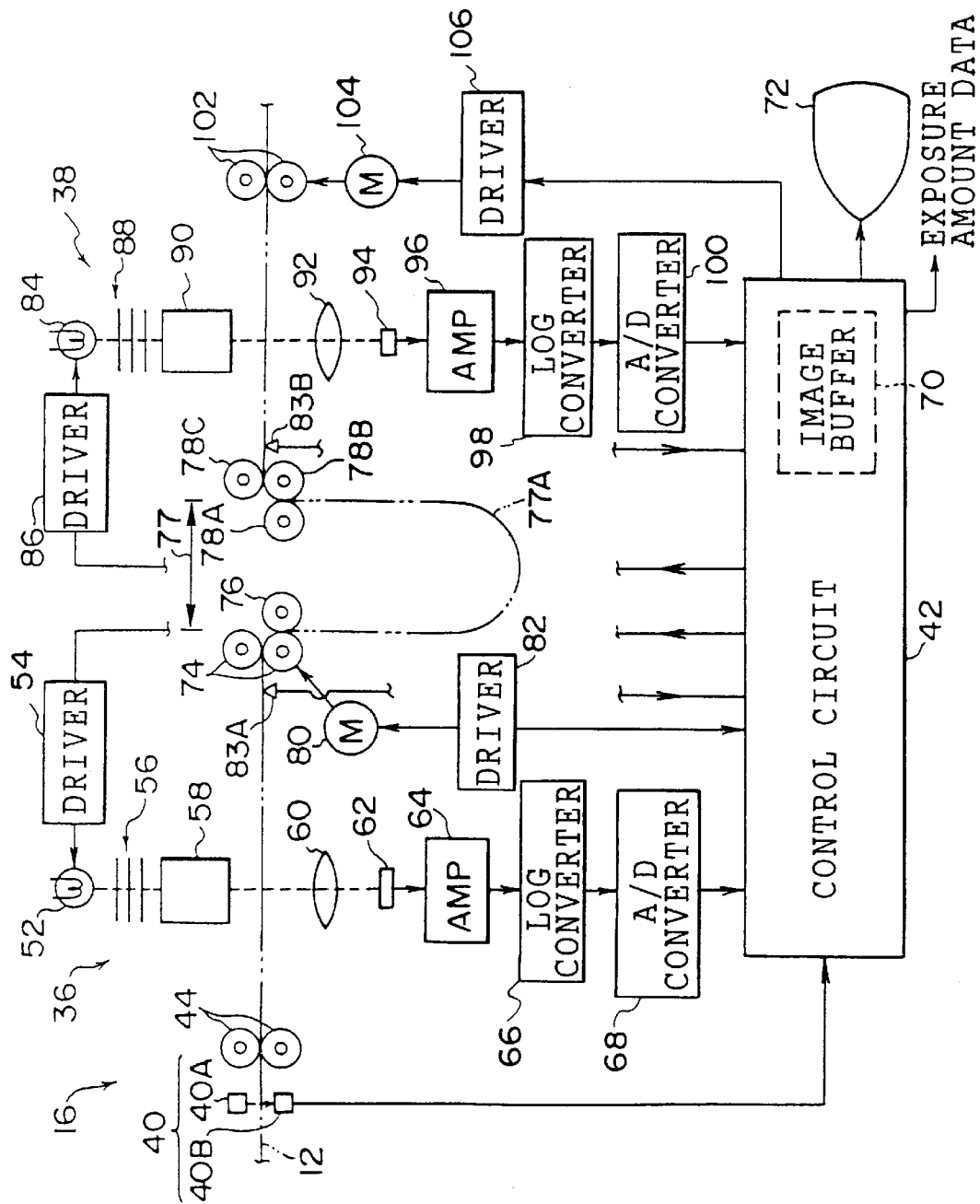
FIG. 2 is a schematic structural diagram of a film image reading apparatus.

Referring now to the attached drawings, an embodiment of the present invention will be described in detail.

FIG. 1 shows a photographic processing system 10 according to the present embodiment, in which a large number of negative films 12 each serving as a photographic photosensitive material on which a predetermined number of images is photographed by a camera (not shown) are carried.

The large number of negative films 12 carried into the photographic processing system 10 are connected together by splice tapes and are wound up in a layered form, and thereafter, these negative films 12 are set in a film processor 14 of the photographic processing system 10.

The film processor 14 includes a color development tank 20, a bleach tank 22, a bleach-fix tank 24, washing tanks 26 and 28, and a stabilization tank 30, which are disposed in the film processor 14 in that order, and these processing tanks are each filled with a predetermined processing solution. The negative film 12 set in the film processor 14 is sequentially carried in each of the tanks, and is subjected to various processing of color development, bleaching, bleach-fixing, washing, and stabilization in such a manner as to be immersed in respective processing solutions. As a result, a negative image recorded, as a latent image, on the negative film 12 is made visible.

A drying section 32 is disposed at a downstream side of the stabilization tank 30. The drying section 32 is provided with a fan and a heater (which are both not shown). Air flow generated by the fan is heated by the heater so as to be made into hot air, and the hot air is supplied to the negative film 12 so as to dry water content applied onto a surface of the negative film 12. The negative film 12 processed in the film processor 14 is set in a film image reading apparatus 16 after having temporarily been wound up in a layered form.

As shown in FIG. 2, a pre-scan section 36 and a fine scan section 38 are disposed within the film image reading apparatus 16 in such a manner as to be arranged along a film conveying path. In each of the scan sections 36 and 38, scan/read processing for images recorded on the negative film 12 is performed, which will be described later.

An insertion detecting sensor 40 is provided at an upstream side of the film conveying path. The insertion detecting sensor 40 is structured in such a manner that a light emitting element 40A and a light receiving element 40B, which form a pair, are disposed to face each other with the film conveying path interposed therebetween. The light receiving element 40B is connected to a control circuit 42. The control circuit 42 makes a determination, based on a change of level of a signal outputted from the light receiving element 40B, as to whether the negative film 12 has been inserted in the film conveying path of the film image reading apparatus 16.

A pair of rollers 44 by which the negative film 12 is nipped and conveyed is disposed between the insertion detecting sensor 40 and the pre-scan section 36.

The pre-scan section 36 includes a lamp 52 which is disposed so as to emit light toward the negative film 12 passing through the pre-scan section 36. The lamp 52 is connected via a driver 54 to the control circuit 42, and the magnitude of voltage supplied from the driver 54 is controlled by the control circuit 42 so that an amount of emitted light becomes a predetermined value. A CC filter group 56 comprised of three CC filters of cyan (C), magenta (M), and yellow (Y), and a light diffusion box 58 are disposed in that order at a light emission side of the lamp 52. Further, an imaging lens 60 and a CCD area sensor 62 are sequentially disposed from the side of the film conveying path so that the imaging lens 60 is opposite to the light diffusion box 58 with respect to the film conveying path.

Each CC filter of the CC filter group 56 is structured in such a manner that an amount by which the filter is inserted into an optical path is in advance adjusted so as to correct variations in the sensitivity between the three colors of red, green, and blue. Light transmitted through the CC filter group 56, the light diffusion box 58, the negative film 12, and the imaging lens 60 in that order is irradiated on a light receiving surface of the CCD area sensor 62.

The CCD area sensor 62 in the present embodiment is structured in such a manner that sensor units each including a sensor for detecting an amount of light of red (R), a sensor for detecting an amount of light of green (G), and a sensor for detecting an amount of light of blue (B), which sensors are disposed adjacently, are arranged in a matrix form with 200 sensor units being disposed along a transverse direction of the negative film 12 and 300 sensor units being disposed along a longitudinal direction of the negative film. Accordingly, the CCD area sensor 62 divides an image into pixels of 200×300 of which size in one side is an interval of adjacent sensor units, and detects an amount of transmitted light for each of the pixels.

The imaging lens 60 allows light transmitted through a frame image to be read, which is recorded on the negative film 12, and a region including both ends in the transverse direction of the negative film 12 to form an image on the light receiving surface of the CCD area sensor 62.

Figure 4A:
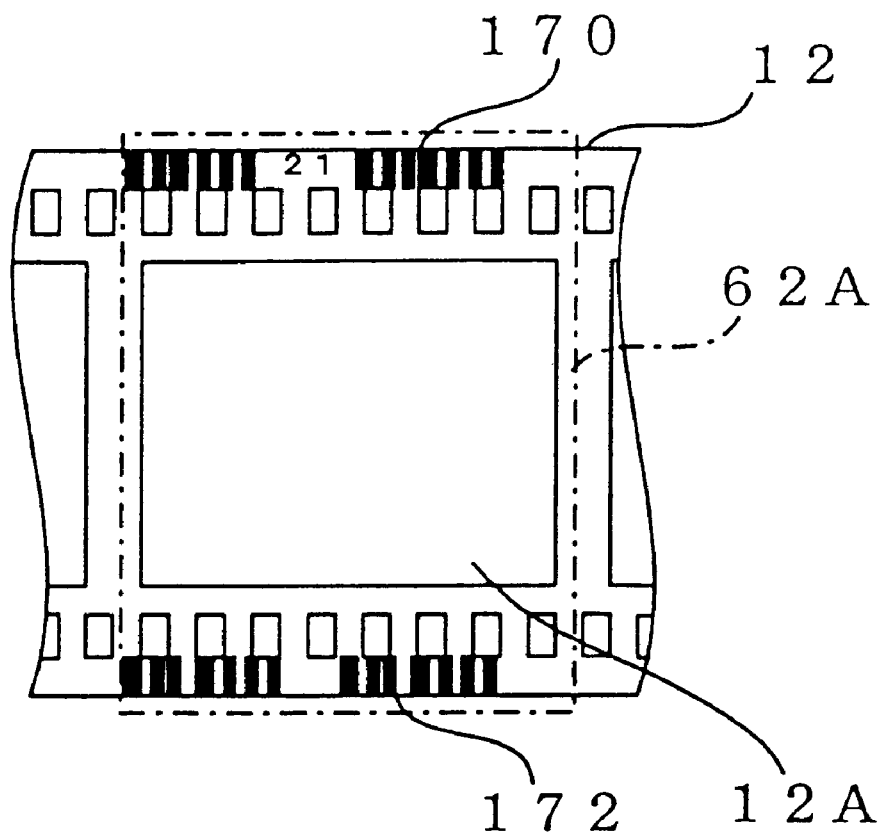
FIG. 4A is a plan view which shows a structure of a negative film and an area to be read by a CCD area sensor.

Accordingly, the CCD area sensor 62 allows reading of an image, which is, as shown in FIG. 4A, a little larger (see 62A) than the negative film 12 in the transverse direction of the negative film 12 and which is a little larger than one frame image 12A in the longitudinal direction of the negative film 12, at one operation.

An amplifier 64, a LOG converter 66, an A/D converter 68 are sequentially connected at an output side of the CCD area sensor 62. A signal outputted from the CCD area sensor 62 is amplified by the amplifier 64 and logarithmically converted by the LOG converter 66 (that is, converted to a level corresponding to a density value), and further converted by the A/D converter 68 to digital data of a value corresponding to a signal level. The A/D converter 68 is connected to the control circuit 42 and the converted digital data is inputted, as density value data, to the control circuit 42.

A position on the conveying path of the negative film 12, at which an image can be read by the CCD area sensor 62, corresponds to a first reading position of the present invention, and the pre-scan section 36 corresponds to a first photometric system of the present invention.

A roller group comprised of a conveying roller pair 74 and a driven roller 76, and a roller group comprised of driven rollers 78A, 78B, and 78C are disposed between the pre-scan section 36 and the fine scan section 38 at a predetermined interval. In a region 77 provided between the two roller groups (hereinafter referred to as a loop region), a loop 77A of the negative film 12 is formed. The loop 77A eliminates a difference between a processing speed of various processing in the pre-scan section 36 and a processing speed of various processing in the fine scan section 38.

A pulse motor 80 is connected to the conveying roller pair 74. The pulse motor 80 is connected via a driver 82 to the control circuit 42. The control circuit 42 drives the pulse motor 80 via the driver 82 so as to convey the negative film 12.

Loop managing sensors 83A and 83B each connected to the control circuit 42 are disposed in vicinities of the upstream side of the conveying roller pair 74 and of the downstream side of the driven rollers 78B and 78C, respectively.

Figure 4B:
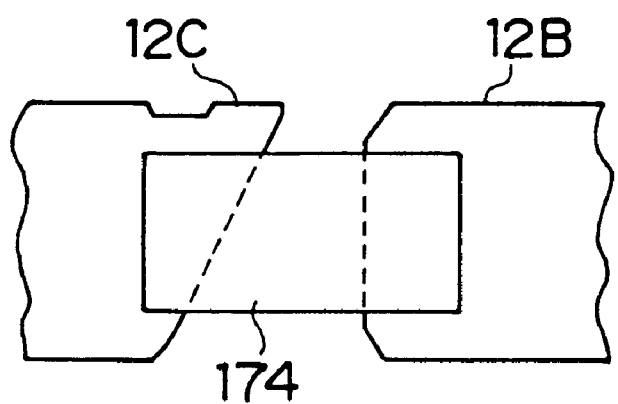
FIG. 4B is a plan view which shows a splice tape.

The loop managing sensors 83A and 83B in the present embodiment are each used to detect a predetermined mark on the negative film 12. The control circuit 42 can detect the length of the loop 77A (that is, the length of the negative film 12 forming the loop 77A) based on a pulse number (that is, a pulse number required for conveying the negative film 12) which is obtained by starting counting of a pulse number supplied to the pulse motor 80 at the time of detecting the predetermined mark by the loop managing sensor 83A, and further stopping counting of the pulse number supplied to the pulse motor 80 at the time of detecting the predetermined mark by the loop managing sensor 83B. Meanwhile, in the present embodiment, a splice tape 174 (see FIG. 4B) for connecting a negative-film rear end 12B and a negative-film leading end 12C to each other is applied as the above-described mark.

The fine scan section 38 and the pre-scan section have substantially the same structures. Namely, the fine scan section 38 is provided with a lamp 84 which emits light toward the negative film 12. The lamp 84 is connected via a driver 86 to the control circuit 42, and the magnitude of voltage supplied from the driver 86 is controlled by the control circuit 42 so that an amount of the emitted light becomes a predetermined value. A CC filter group 88 comprised of three CC filters, and a light diffusion box 90 are sequentially disposed at a light emission side of the lamp 84. An imaging lens 92 and a CCD line sensor 94 are sequentially disposed from the side of the film conveying path so that the imaging lens 92 is opposite to the light diffusion box 90 with respect to the film conveying path.

Each CC filter of the CC filter group 88 is provided in such a manner that an amount by which the filter is inserted into the optical path is in advance adjusted to correct variations in sensitivity between the three colors of R, G, and B in the CCD line sensor 94. Light sequentially transmitted through the CC filter group 88, the light diffusion box 90, the negative film 12, and the imaging lens 92 is irradiated on the light receiving surface of the CCD line sensor 94. The CCD line sensor 94 is constructed so that sensor units each including a sensor for detecting an amount of light of red, a sensor for detecting an amount of light of green, and a sensor for detecting an amount of light of blue, which sensors are disposed adjacently, are arranged at predetermined intervals along the transverse direction of the negative film 12. The CCD line sensor 94 in the present embodiment is formed in such a manner that 1,000 sensor units (including 1,000 pixels) are arranged along the transverse direction of the negative film 12.

Accordingly, the CCD line sensor 94 divides an image into a large number of pixels (in the present embodiment, 1,000 pixels) of which size in one side is an interval of adjacent sensor units, and detects an amount of transmitted light for each of the pixels. The above-described imaging lens 92 allows light crossing an optical axis of light emitted from the lamp 84 and transmitted through one row of pixels arranged along the transverse direction of the negative film 12, among the light transmitted through the negative film 12, to form an image on the light receiving surface of the CCD line sensor 94.

An amplifier 96, a LOG converter 98, and an A/D converter 100 are sequentially connected at an output side of the CCD line sensor 94. A signal outputted from the CCD line sensor 94 is amplified in the amplifier 96 and is converted to a level corresponding to a density value in the LOG converter 98, and thereafter, it is converted by the A/D converter 100 to digital data. The A/D converter 100 is connected to the control circuit 42 and the converted digital data is inputted, as density value data, to the control circuit 42.

The control circuit 42 includes an image buffer 70 in which density value data of an image having several sides can be held, and the density value data inputted to the control circuit 42 is stored in the image buffer 70. Further, a CRT display 72 is connected to the control circuit 42, and by performing processing using the inputted density value data, a positive image is displayed on the CRT display 72.

Further, the control circuit 42 calculates, based on the above-described density value data, respective exposure amounts of light of the three colors R, G, and B on a photographic printing paper. The control circuit 42 is connected to a printer section 110 of a printer processor 18, which will be described later, and transfers data, which represents the above-described calculated exposure amounts, to a control circuit 122 (also seen FIG. 3) of the printer section 110.

A position on the conveying path of the negative film 12, at which an image can be read by the CCD line sensor 94, corresponds to a second reading position of the present invention, the fine scan section 38 corresponds to a second photometric system of the present invention, and the control circuit 42 corresponds to the control device of the present invention.

A conveying roller pair 102 is disposed at a downstream side of the fine scan section 38. A pulse motor 104 is connected to the conveying roller pair 102. The pulse motor 104 is connected via a driver 106 to the control circuit 42. The control circuit 42 drives the pulse motor 104 via the driver 106 so as to convey the negative film 12.

On the other hand, a magazine 114 in which a photographic printing paper 112 wound in a layered form is accommodated is set in the printer processor 18 (see FIG. 1). The photographic printing paper 112 is pulled out from the magazine 114 and is conveyed to the printer section 110 via a cutter section 116. When exposure amount data is transferred from the control circuit 42 of the film image reading apparatus 16 to the printer section 110, an image is exposed onto the photographic printing paper 112 based on the exposure amount data in the printer section 110. The film image reading apparatus 16 and the printer process 18 form an image processing system.

Figure 3:
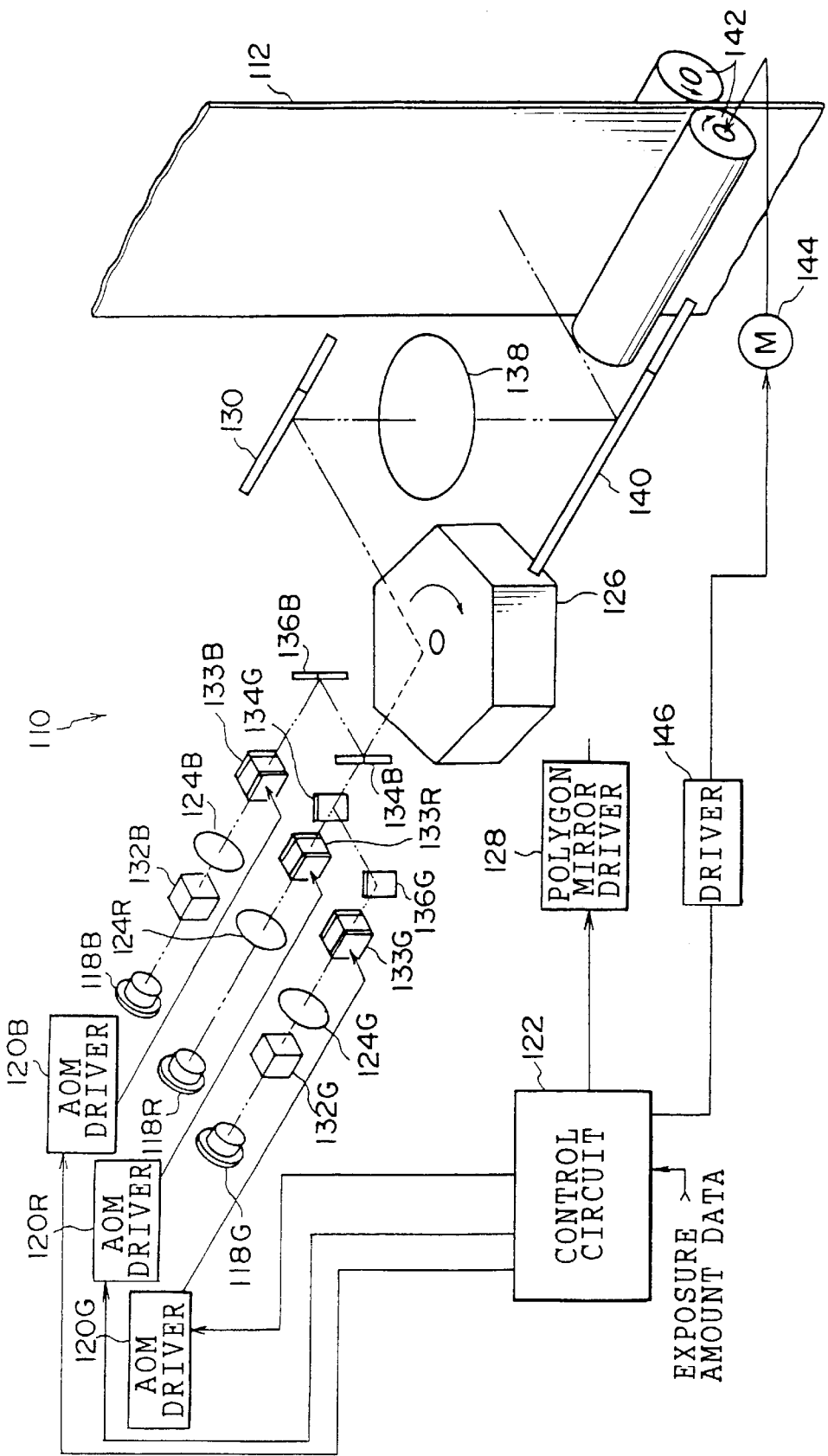
FIG. 3 is a perspective view which schematically shows a printer section.

As shown in FIG. 3, the printer section 110 includes a semiconductor laser 118R which emits a laser beam having a wavelength of R. A collimator lens 124R, an acoustooptic element (AOM) 133R, a dichroic mirror 134G by which only light having a wavelength of G is reflected, a dichroic mirror 134B by which only light having a wavelength of B is reflected, and a polygon mirror 126 are sequentially disposed at a side of the semiconductor laser 118R from which a laser beam is emitted.

Each AOM 133 includes an acoustooptic medium, and a transducer which outputs an ultrasonic wave in accordance with an inputted high frequency signal and a sound absorbing body which absorbs sound of an ultrasonic wave having passed through the acoustooptic medium are attached to facing surfaces of the acoustooptic element. The transducer of the AOM 133R is connected to an AOM driver 120R, and when a high frequency signal is inputted from the AOM driver 120R, one beam of incident laser beams is diffracted and is emitted as a recording laser beam. The recording laser beam is made incident on the polygon mirror 126 via the dichroic mirrors 134G and 134B.

Figure 10:
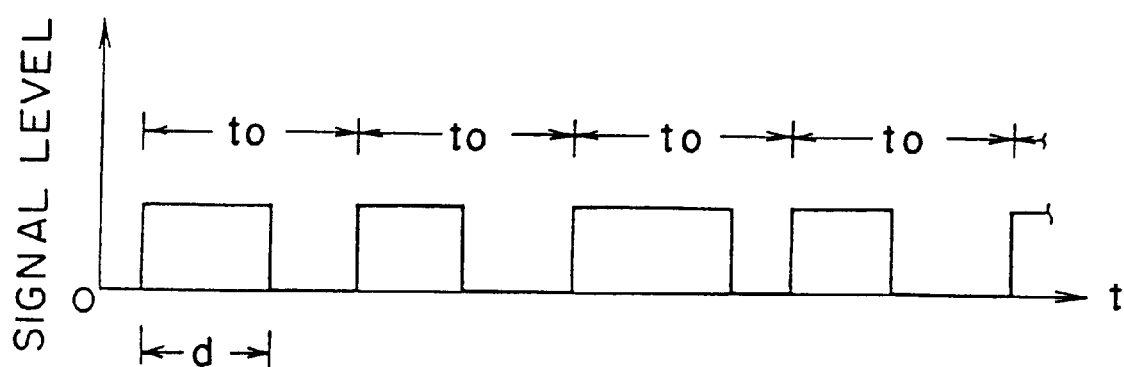
FIG. 10 is a diagram which shows a wave form of an exposure-amount control signal to be outputted to an AOM driver.

The AOM driver 120R is connected to the control circuit 122. The control circuit 122 outputs, to the AOM driver 120R, an exposure amount control signal corresponding to exposure amount data of R among the inputted exposure amount data. The exposure amount control signal is a pulse signal having a period to as shown in FIG. 10. A pulse width d is varied in accordance with an exposure amount for each of pixels of the exposure amount data of R. When the level of the inputted exposure amount control signal is high, the AOM driver 120R outputs a high frequency signal to the AOM 133R, and at the same time, a recording laser beam is emitted from the AOM 133R. Accordingly, based on the exposure amount data of R, an amount of a laser beam having a wavelength of R irradiated on the photographic printing paper 112 is varied for each period $T_o$.

Further, the printer section 110 includes semiconductor lasers 118G and 118B, which each emit a laser beam of a predetermined wavelength. A wavelength conversion element 132G, a collimator lens 124G, an AOM 133G, and a total reflection mirror 136G are sequentially disposed at a side of the semiconductor laser 118G from which a laser beam is emitted. The AOM 133G is connected to the control circuit 122 via the AOM driver 120G. The control circuit 122 outputs, to the AOM driver 120G, an exposure amount control signal corresponding to exposure amount data of G. The AOM driver 120G outputs a high frequency signal with the exposure amount control signal being set to be high in the same way as in the AOM driver 120R.

As a result, the laser beam emitted from the semiconductor laser 118G is converted to that having a wavelength of G by the wavelength conversion element 132G and made incident on the AOM 133G. When a high frequency signal is being inputted from the AOM driver 120G, a recording laser beam is emitted from the AOM 133G and reflected by the total reflection mirror 136G and also by the dichroic mirror 134G, and is further combined with a laser beam emitted from the semiconductor laser 118R.

Further, a wavelength conversion element 132B, a collimator lens 124B, an AOM 133B, and a total reflection mirror 136B are sequentially disposed at a side of a semiconductor laser 118B from which laser beam is emitted. The AOM 133B is also connected to the control circuit 122 via an AOM driver 120B. The control circuit 122 outputs an exposure amount control signal corresponding to exposure amount data of B to the AOM driver 120B. The laser beam emitted from the semiconductor laser 118B is converted to that having a wavelength of B by the wavelength conversion element 132B and is made incident on the AOM 133B. A recording laser beam emitted from the AOM 133B when a high frequency signal is inputted from the AOM driver 120B is reflected by the total reflection mirror 136B and also by the dichroic mirror 134B, and further combined with the laser beam emitted from the semiconductor laser 118R and the laser beam emitted from the semiconductor laser 118G.

The laser beams combined by the dichroic mirrors 134G and 134B are made incident on the polygon mirror 126. The polygon mirror 126 is connected to the control circuit 122 via a polygon mirror driver 128 and is driven to rotate by the polygon mirror driver 128, and further, a rotational speed of the polygon mirror 126 is controlled. A direction to which the laser beams made incident on the polygon mirror 126 are emitted is changed sequentially by rotation of the polygon mirror 126 so as to allow scanning along a horizontal direction shown in FIG. 3. A mirror 130 is disposed at a side of the polygon mirror 126 from which a laser beam is emitted. The laser beam reflected by the polygon mirror 126 is reflected by the mirror 130 toward the lower side of the paper of FIG. 3.

A scanning lens 138 and a mirror 140 are sequentially disposed at a side of the mirror 130 from which a laser beam is emitted. The laser beam reflected by the mirror 130 is transmitted through the scanning lens 138 and reflected by the mirror 140. The photographic printing paper 112 is disposed at a side of the mirror 140 from which a laser beam is emitted so that the longitudinal direction thereof coincides with the vertical direction of the paper of FIG. 3. The laser beam reflected by the mirror 140 is irradiated on the photographic printing paper 112. Further, a conveying roller pair 142 for nipping and conveying the photographic printing paper 112 is disposed below a position on the conveying path of the photographic printing paper 112, at which a laser beam is irradiated. A pulse motor 144 is connected to the conveying roller pair 142. The pulse motor 144 is connected via a driver 146 to the control circuit 122. The control circuit 122 drives to rotate the pulse motor 144 via the driver 146 so as to convey the photographic printing paper 112 toward the lower side of the paper of FIG. 3.

As shown in FIG. 1, the photographic printing paper 112 having passed through the printer section 110 is conveyed to a reservoir section 150. The reservoir section 150 includes a pair of rollers 152, which rollers are disposed at a predetermined interval, and a loop is formed in the photographic printing paper 112 between the pair of rollers 152. The loop thus formed eliminates a difference in the speed at which the photographic printing paper is conveyed between the printer section 110 and a processor section 154 at a downstream side. The processor section 154 includes a color development tank 156, a bleach-fixing tank 158, and washing tanks 160, 162, and 164, which tanks are arranged in the numerical order. Each of the processing tanks is filled with a predetermined processing solution. The photographic printing paper 112 is conveyed sequentially to these processing tanks, and is processed therein in such a manner as to be immersed in each processing solution.

A drying section 166 is provided at a downstream side of the processor section 154. The drying section 166 supplies, to the photographic printing paper 112, hot air generated by a fan and a heater (which are both not shown). As a result, moisture applied onto the surface of the photographic printing paper 112 is removed and the paper is thereby dried. The photographic printing paper 112 having passed through the drying section 166 is cut for each print in the cutter section 168, and thereafter, it is discharged from the printer processor 18.

A bar code 170 which indicates a frame number, and a bar code 172 which indicates a DX code (which shows a photographic film manufacturer and a film sensitivity) are, as shown in FIG. 4A, recorded for each frame image 12A at both ends, in the transverse direction (which is perpendicular to the direction in which the negative film 12 is conveyed), of the negative film 12 to be read in the present embodiment.

Next, operation of the present embodiment will be described. The negative film 12 set in the film processor 14 is subjected to various processing including color development, bleaching, bleach-fixing, washing, stabilization, and drying in such a manner as to be conveyed sequentially into various processing tanks and is thereafter conveyed to the drying section 32. As a result, a latent image recorded by a camera is made visible. The negative film 12 processed in the film processor 14 is set in the film image reading apparatus 16.

Next, operation of the pre-scan section 36 of the film image reading apparatus 16 will be described with reference to the flow charts shown in FIGS. 5 and 6.

Figure 5:
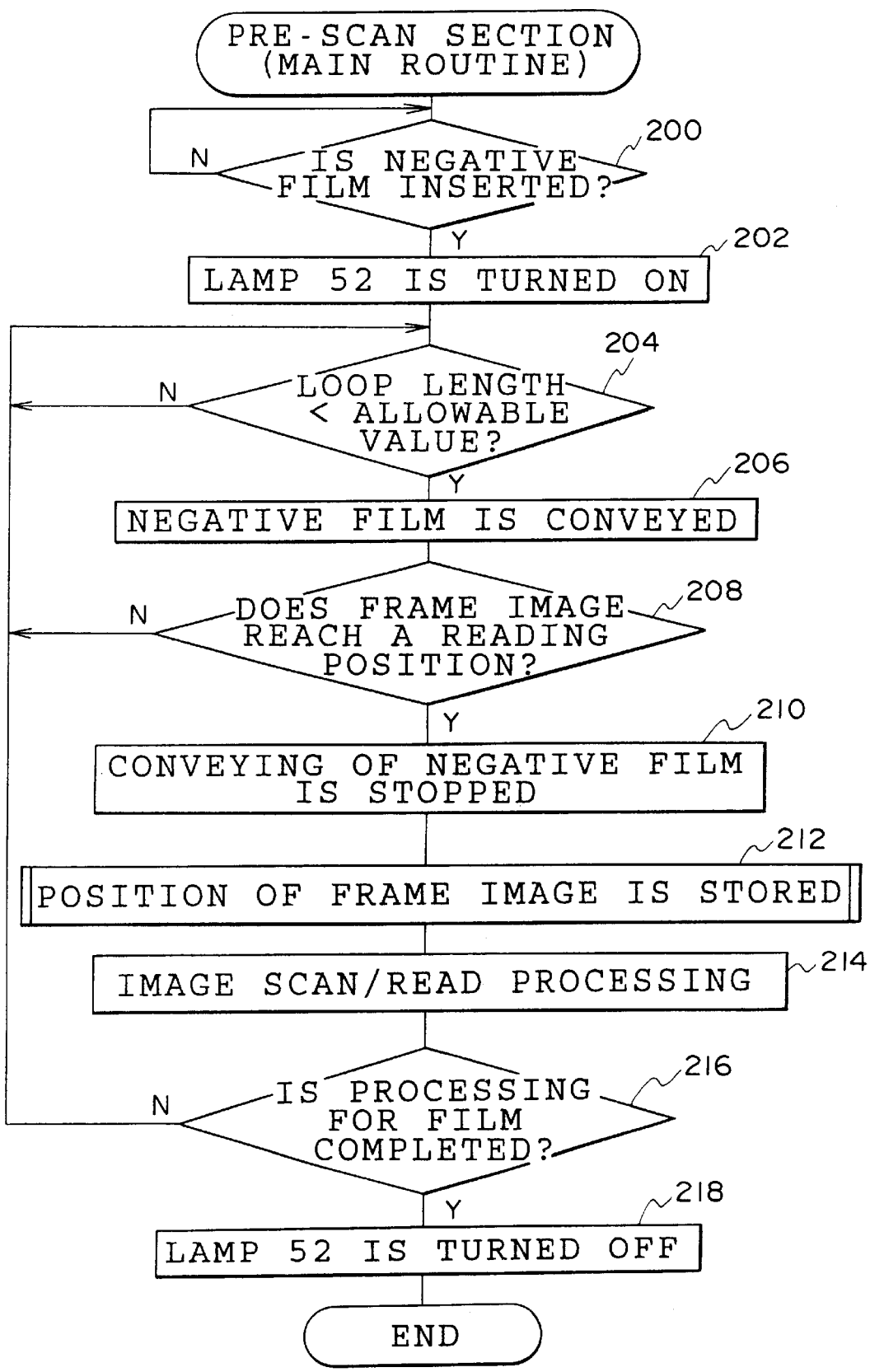
FIG. 5 is a flow chart which illustrates a main routine of a pre-scan section in the film image reading apparatus.
Figure 6:
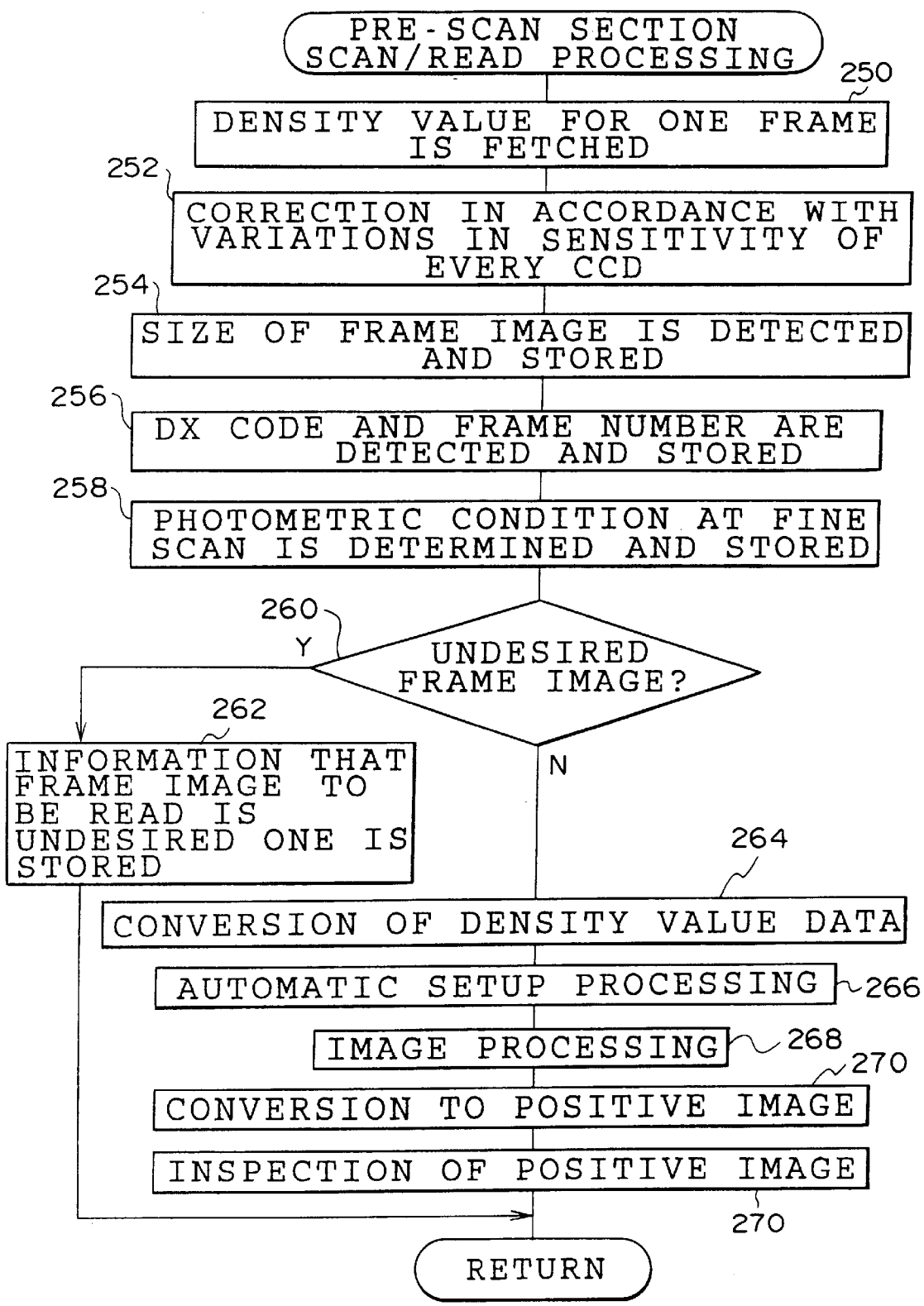
FIG. 6 is a flow chart which illustrates scan/read processing of the pre-scan section.

In step 200 shown in FIG. 5, it is determined, based on a signal inputted from the insertion detecting sensor 40, whether the negative film 12 has been inserted in the film image reading apparatus 16. When it is determined that the negative film 12 has been inserted in the film image reading apparatus 16, the decision of step 200 is made affirmative and the process proceeds to step 202.

In step 202, the lamp 52 is turned on by the driver 54. In this case, an amount of light of the lamp 52 is set at a preset fixed value, and a mechanism for adjusting the amount of light, and the like is not required. As a result, the structure of the driver 54 can be simplified.

In the subsequent step 204, the length of the loop 77A in the loop region 77 provided between the pre-scan section 36 and the fine scan section 38 is detected based on output signals from the loop managing sensors 83A and 83B, and a determination is made as to whether the length of the loop 77A is smaller than a predetermined allowable value. When the length of the loop 77A is not smaller than the predetermined allowable value, the process is placed in a waiting state until it becomes smaller.

Namely, for example, when a processing speed in the fine scan section 38 for one frame image is lower than that in the pre-scan section 36, the loop length gradually becomes longer with the passage of time and thereby exceeds the above-described predetermined allowable value. Accordingly, in step 204, when the loop length becomes the allowable value or greater, the operation in the pre-scan section 36 is temporarily stopped.

When the loop length is smaller than the allowable value, that is, when the decision of step 204 is made affirmative, the process proceeds to step 206, in which an operation of conveying the negative film 12 is started.

In step 208, it is determined whether a frame image has reached a predetermined image reading position, more specifically, whether a frame image to be read has been located within a region which can be read by the CCD area sensor 62. The negative film 12 has unexposed regions existing between frame images, and the unexposed regions are in a white state. For this reason, at edges of the frame image (that is, edges at leading and trailing ends of the negative film 12 in the direction in which the film is conveyed), density value data outputted from the CCD line sensor 62 and inputted to the control circuit 42 changes greatly. Accordingly, a determination can be made, based on a position at which the density value data changes greatly, as to whether the frame image has reached the above-described predetermined image reading position.

When in step 208 it is determined that the frame image has not reached the image reading position (that is, when the decision of step 208 is made negative), the process returns to step 204 and the operation of step 204 to step 208 is executed repeatedly until the frame image has reached the image reading position, and subsequently, the process proceeds to step 210.

In step 210, the operation of conveying the negative film 12 is stopped. In the subsequent step 212, the position of the frame image to be read is stored in a storage portion (not shown) provided in the control circuit 42. Namely, at this point in time, the frame image to be read is located at the image reading position in the pre-scan section 36, and therefore, based on edge positions of the frame image to be read at this point in time, the position of the frame position is determined in correspondence with the position of a perforation provided in the negative film 12, or the like, and the position of the frame image is stored in the aforementioned storage portion (not shown).

When storage of the position of the frame image has been completed, in step 214, image scan/read processing (which will be described later) is executed. Subsequently, in step 216, it is determined whether processing for all frame images recorded on the negative film 12 has been completed. When the decision of step 216 is made negative, the process returns to step 204 and the aforementioned operation is executed repeatedly. When the decision of step 216 is made affirmative, the process proceeds to step 218, in which the lamp 52 is turned off, and thereafter, the present processing ends.

As described above, in the pre-scan section 36, with the aforementioned loop length being smaller than the allowable value, storage of the position of a frame image to be read, and scan/read processing of the frame image are sequentially performed for a single frame image.

A description will be hereinafter given of the details of the scan/read processing (that is, the processing of step 214 in FIG. 5) in the pre-scan section 36 with reference to the flow chart shown in FIG. 6. When this processing is executed, a frame image is located at the image reading position, light emitted from the lamp 52 and transmitted through the CC filter group 56, the light diffusion box 58, and the negative film 12 is made to form an image on the light receiving surface of the CCD area sensor 62 by the imaging lens 60, a signal outputted from the CCD area sensor 62 is amplified in the amplifier 64 and converted to a level corresponding to the density level in the LOG converter 66, and is further converted to digital data in the A/D) converter 68 and held therein.

In step 250, density value data for one frame image is fetched from the A/D converter 68. In the subsequent step 252, the fetched density value data is corrected in accordance with variations in sensitivity of a large number of sensor units arranged in a matrix form.

In step 254, the size of a frame image is detected based on the density value data corrected in step 252 and is stored in the aforementioned storage portion (not shown). When a photographic film in 135 magazines is used as the negative film 12 to be read, the size of a frame image (in this case, the frame size of a frame image) can be determined based on, for example, whether the density or color tint of a predetermined portion corresponds to that of an unexposed portion (a white region), which predetermined portion is provided within an image recording range in a standard-size frame image and is provided outside the image recording range in a nonstandard-size (panorama-size or the like) film image.

Further, as disclosed in Japanese Patent Application Laid-Open (JP-A) Nos. 8-304932, 8-304933, 8-304934, and 8-304935, the size (aspect ratio) of a film image may be determined by, based on respective density value data of pixels obtained by pre-scan, calculating a density variation value along a direction perpendicular to the conveying direction of the film for each pixel, adding respective density variation values, along the direction perpendicular to the conveying direction of the film, of the pixels by lines along the longitudinal direction of the film, and further, comparing added values by lines, or may be determined based on a ratio of an image, which is a binary image provided by obtaining a threshold value from a density histogram, existing in each region of an image. Alternatively, the size of a film image may also be determined using a combination of the aforementioned methods.

In step 256, a frame number and a DX code are detected based on density value data corresponding to respective regions of the bar codes 170 and 172, which are recorded at both ends, in the transverse direction, of the negative film 12, and are stored in the aforementioned storage portion (not shown). In the subsequent step 258, based on the density value data corresponding to the region of the frame image to be read, optimum photometric conditions during fine scan in the fine scan section 38 (that is, an amount of light from the lamp 84, and a charge accumulation time in the CCD line sensor 94) are determined and stored in the aforementioned storage portion (not shown).

In the present embodiment, a minimum value of the density value data is extracted, and based on the minimum value, an optimum amount of light of the lamp 84 of the fine scan section 38 for a read frame image, and a charge accumulation time of the CCD line sensor 94 are calculated and stored. The reason why is that, when the minimum value of the density value data is very small, there is a possibility that a level of an output signal from the CCD line sensor 94 saturates during image reading in the fine scan section 38.

In step 260, it is determined whether, based on density value data corresponding to the region of a frame image to be read, the frame image to be read is an undesired frame image. When it is an undesired frame image, in step 262, the information is stored, and thereafter, the scan/read processing ends.

In the present embodiment, as the aforementioned undesired frame image, there are provided an image in which focusing is not made on a main subject in a frame image (that is, a so-called unfocused image), and an ultra-overexposed or ultra-underexposed image in which a state of a main subject cannot be recognized. The determination as to whether an image is unfocused can be made based on whether image data has a high frequency (when there is no high frequency, it is determined that the image is unfocused). Further, the ultra-overexposed or ultra-underexposed image can be determined by, for example, the magnitude of an average value of density value data corresponding to the frame image to be read.

On the other hand, when in step 260 it is determined that the frame image to be read is not an undesired frame image, the process proceeds to step 264, in which density value data corresponding to a region of the frame image to be read is converted by a look-up table obtained in advance by an experiment or the like and stored in the storage portion (not shown) so as to become the substantially same characteristics as those of density value data obtained by the fine scan section 38.

In step 266, automatic setup processing is performed in which the density level of a frame image is determined based on the density value data converted in step 264 and a processing condition of image processing for the density value data is obtained based on the density level and stored.

The density level of a frame image can be determined based on the density classification of low density, normal density, high density, ultra high density, and the like by making a comparison of, for example, average density, maximum density, or minimum density with a predetermined value. Further, as the processing condition for image processing, for example, an enlargement/reduction ratio of an image, a processing condition of image processing for hyper-tone or hyper-sharpness (specifically, compression of gradation to an ultra low frequency brightness component of an image, or a gain (degree of highlighting) for a high frequency component or an intermediate frequency component of an image), and a gradation conversion condition are calculated.

When the automatic setup processing ends, in step 268, image processing (enlargement/reduction of an image, gradation conversion, hyper-tone processing, or hyper-sharpness processing) is performed for the density value data converted in step 264 in accordance with the processing condition of image processing obtained by the aforementioned automatic setup processing. In the subsequent step 270, the density value data subjected to the image processing is converted to data of a positive image. In step 272, inspection of a positive image is performed in which a positive image is displayed on a CRT display 72 based on the positive-image data, and by referring to the displayed image, correction of color, density, and the like is indicated by, for example, an operator. Subsequently, the present scan/read processing ends.

In the inspection of a positive image in the above-described step 272, when any instruction for correction is given by an operator, the correction corresponding to the instruction is reflected on the processing condition of image processing stored in the automatic setup processing of step 266.

Figure 7:
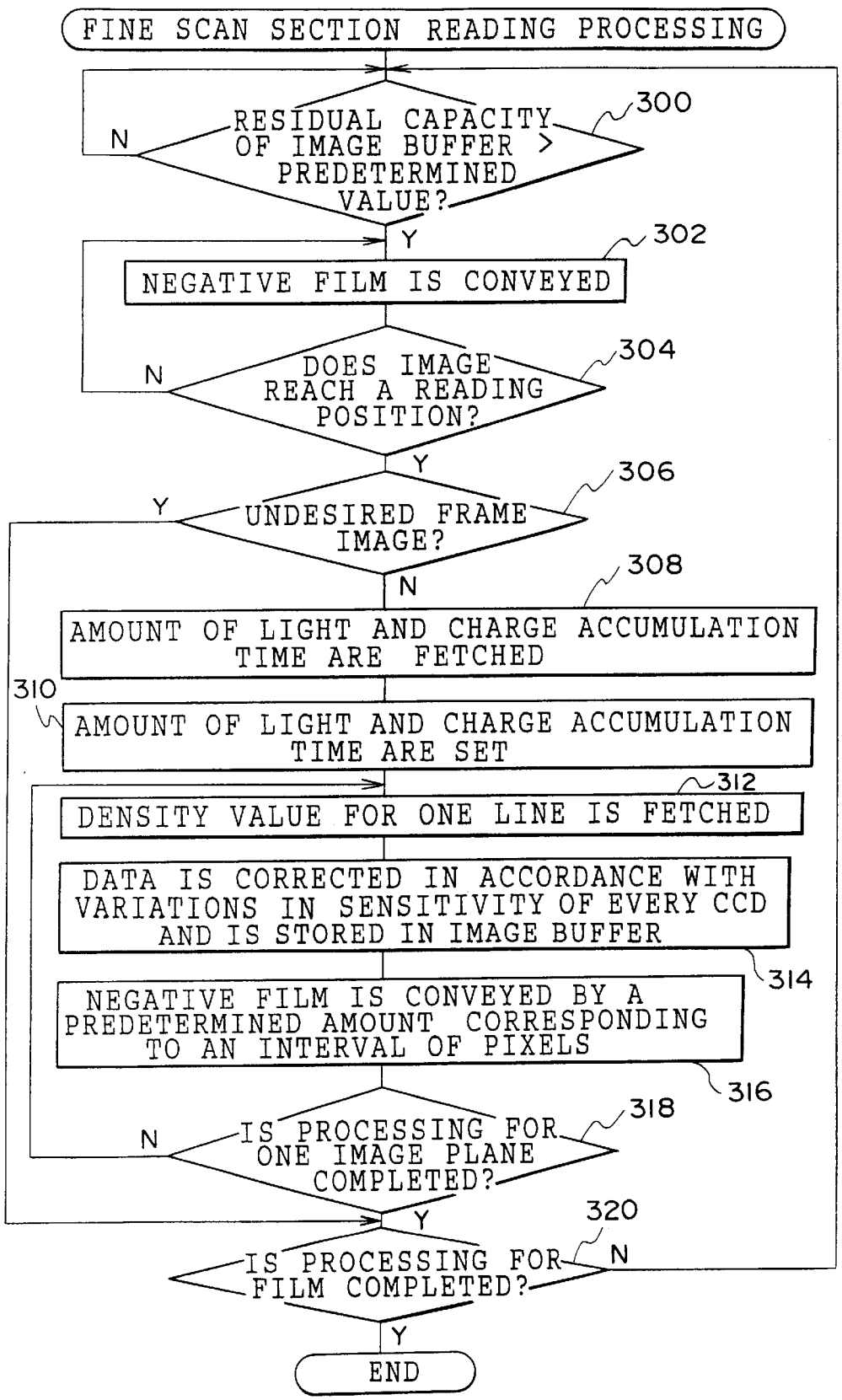
FIG. 7 is a flow chart which illustrates reading processing in a fine scan section of the present embodiment.

Next, image reading processing in the fine scan section 38 will be described with reference to the flow chart shown in FIG. 7.

In step 300, it is determined whether a residual capacity of the image buffer 70 is larger than a predetermined value, and when it is not larger (that is, when the decision of step 300 is made negative), the process is placed in a waiting state. Namely, the image buffer 70 stores sequentially density value data obtained by processing, which will be described later. Therefore, the residual capacity gradually decreases with the passage of time. When the residual capacity continuously decreases, finally, the density value data cannot be stored in the image buffer 70. In the worst case, the entire apparatus may stop. In order to avoid this disadvantage, in step 300, the residual capacity of the image buffer 70 is checked.

In step 302, the operation of conveying the negative film 12 is started. In the subsequent step 304, it is determined whether a leading row of pixels of an image has reached the image reading position by the CCD line sensor 94. When the decision of step 304 is made negative, the process returns to step 302, and the operation of steps 302 and 304 are repeatedly executed until the decision of step 304 is made affirmative, and the negative film 12 is continuously conveyed. The determination in step 304 can be made based on the position of the frame image stored in the storage portion (not shown) in the aforementioned step 212 (also seen in FIG. 5).

When the decision of step 304 is made affirmative, the process proceeds to step 306, in which it is determined whether a frame image to be subjected to fine scan is an undesired one by referring to the information which indicates whether a frame image is the undesired frame image stored in the storage portion (not shown) by the aforementioned steps 260 and 262. When the frame image is the undesired one, the process proceeds to step 320, which will be described later. When it is not the undesired frame image, the process proceeds to step 308.

In step 308, the optimum amount of light of the lamp 84 corresponding to the frame image to be read, and the charge accumulation time in the CCD line sensor 94, which are obtained and stored in the aforementioned step 258 (also seen in FIG. 6), are fetched. In the subsequent step 310, a voltage to be supplied to the lamp 84 is controlled so as to be set at a value corresponding to the above-described optimum amount of light, and the charge accumulation time in the CCD line sensor 94 is set to become that fetched in step 308. Meanwhile, the amount of light of the lamp 84 can also be controlled by varying an amount by which each CC filter of the CC filter group 88 is inserted into the optical path. Further, in the aforementioned setting of the charge accumulation time, when the charge accumulation time to be set exceeds time for conveying one pixel of the negative film 12 by the pulse motor 104, the speed at which the negative film 12 is conveyed by the pulse motor 104 also needs to be varied (that is, the longer the charge accumulation time becomes, the slower the speed at which the negative film 12 is conveyed is made).

After the operation of step 310 is executed, the process proceeds to step 312 after a short time, that is, after the amount of light of the lamp 84 becomes stable. In steps 312 to 318, the image reading processing is performed.

Namely, in step 312, density value data of one row of pixels is fetched from the A/D converter 100. In the subsequent step 314, the fetched density value data is corrected in accordance with variations in the sensitivity of a large number of sensor units in the CCD line sensor 94, and the corrected data is stored in the image buffer 70.

In step 316, the pulse motor 104 is driven via the driver 106 and the negative film 12 is conveyed by a predetermined amount corresponding to an interval of rows of pixels. The amount by which the negative film 12 is conveyed corresponds to the interval of the sensor units. Accordingly, the fine scan section 38 divides an image into a large number of pixels more finely than the pre-scan section 36, and measures an amount of transmitted light for each of the pixels.

In step 318, it is determined whether reading of an image for one image plane has been completed. When the decision of step 318 is made negative, the process returns to step 312, and the operation of steps 312 to 318 is executed repeatedly until the decision of step 318 is made affirmative. As a result, R image data, G image data, and B image data of a single frame image are stored in the image buffer 70. The determination of the aforementioned step 318 is made based on the size of the frame image detected and stored in the above-described step 254 (see FIG. 6).

In the subsequent step 320, it is determined whether density value data for all of frame images recorded on the negative film 12 has been stored in the image buffer 70. When the decision of step 320 is made negative, the process returns to step 300 and the operation of steps 300 to 320 is executed repeatedly. When the decision of step 320 is made affirmative, the present reading processing ends.

Figure 8:
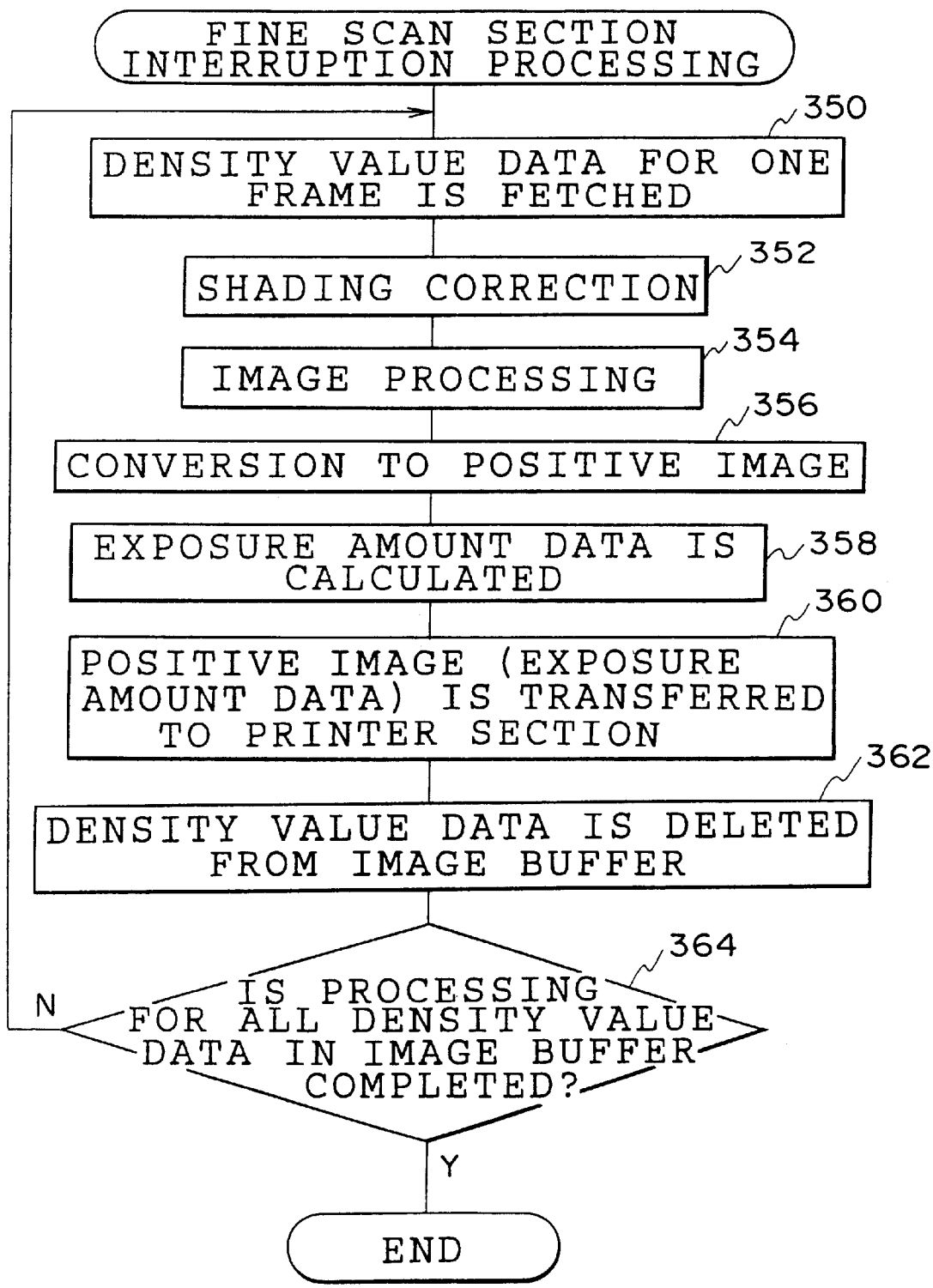
FIG. 8 is a flow chart which illustrates interruption processing in the fine scan section of the present embodiment.

Next, with reference to the flow chart shown in FIG. 8, a description will be given of interruption processing executed in the control circuit 42 when density value data for at least one frame image is stored in the image buffer 70.

First, in step 350, density value data for one frame image is fetched from the image buffer 70. In the subsequent step 352, shading correction is performed. The reason why is that the amount of light emitted from the lamp 84 has a distribution pattern in which it gradually attenuates from the position on the optical axis, which is set as a peak, to a peripheral region. In this step 352, density value data fetched from the image buffer 70 is corrected in accordance with the previously measured distribution of the amount of light from the lamp 84.

In step 354, image processing (enlargement/reduction of an image, gradation conversion, hyper-tone processing, or hyper-sharpness processing) is performed in accordance with the processing condition of image processing, which is obtained by the automatic setup processing in the aforementioned step 266 (also seen in FIG. 6) for density value data in a region of the frame image to be read and which is corrected by the positive-image inspection in the aforementioned step 272 as occasion demands. In the subsequent step 356, the density value data after image processing is converted to the data of a positive image.

In step 358, exposure amount data which represents respective exposure amounts of R, G, and B for each pixel is obtained by exponential conversion of the positive-image data obtained by step 356. In the subsequent step 360, the exposure amount data thus calculated is transferred to the control circuit 122 of the printer section 110. In step 362, the density value data corresponding to the exposure amount data transferred to the printer section 110 is deleted from the image buffer 70.

In step 364, it is determined whether the operation of the aforementioned steps 350 to 362 for all density value data stored in the image buffer 70, that is various processing including the shading correction, the transfer of the exposure amount data to the printer section 110, and the like has been completed. When it has not been completed, the process returns to step 350 and the aforementioned various processing is executed repeatedly. Subsequently, the interruption processing ends.

Figure 9:
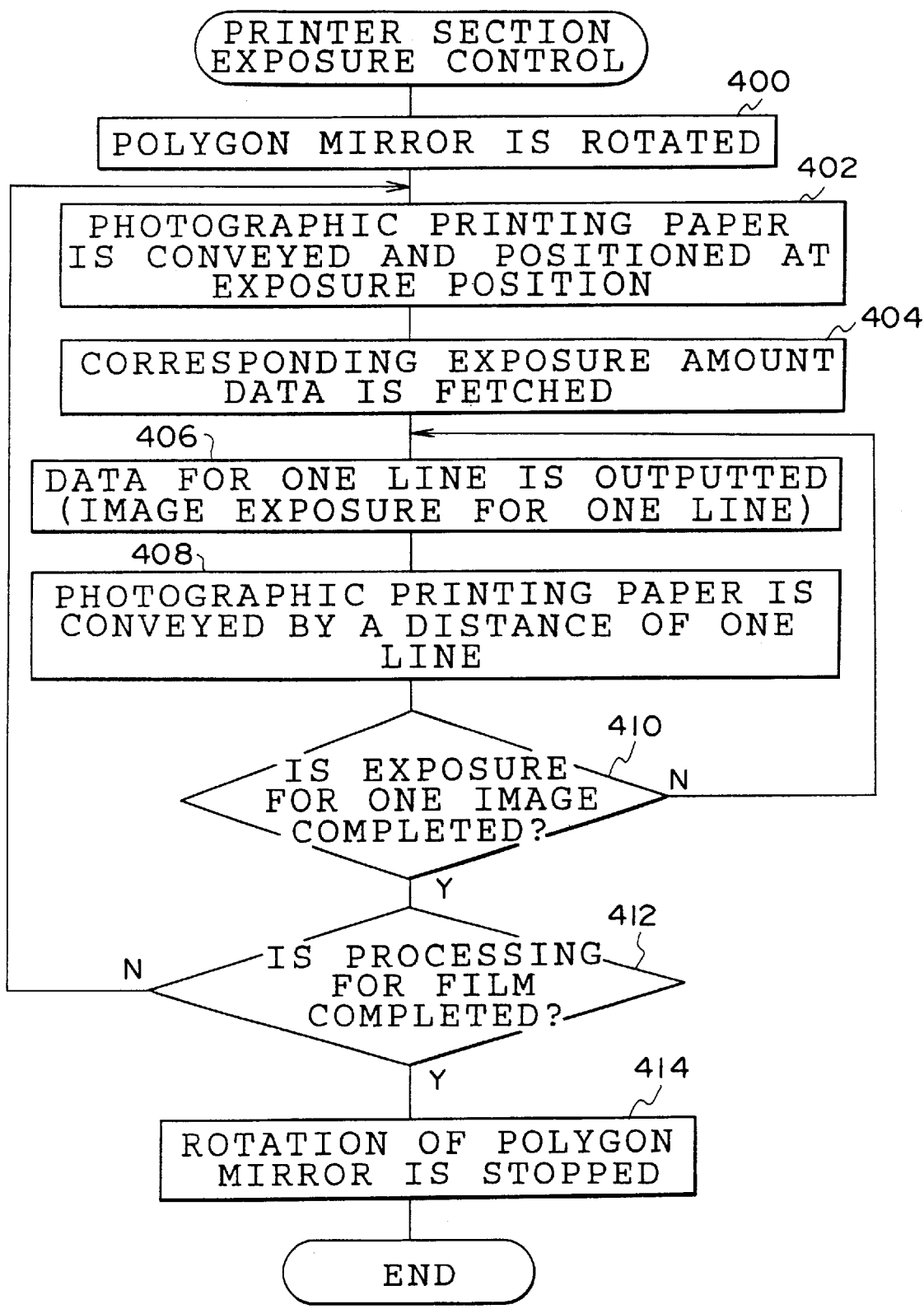
FIG. 9 is a flow chart which illustrates exposure processing in a printer section.

Next, a description will be given of exposure control processing in the printer section 110 with reference to the flow chart shown in FIG. 9. In step 400, rotation of the polygon mirror 126 is started. In step 402, the photographic printing paper 112 is conveyed via the pulse motor 144 and an unexposed portion of the photographic printing paper 112 is located at an exposure position. In step 404, exposure amount data corresponding to an image to be exposed is fetched. In step 406 and subsequently thereto, exposure of an image onto the photographic printing paper is performed. Namely, in step 406, among the fetched exposure amount data, an exposure amount control signal according to exposure amount data of R corresponding to a first one line is outputted to the AOM driver 120R, an exposure amount control signal corresponding to exposure amount data of G is outputted to the AOM driver 120G, and an exposure amount control signal corresponding to exposure amount data of B is outputted to the AOM driver 120B.

When the level of each of the inputted exposure amount control signals is high, the AOM drivers 120R, 120G, and 120B output high frequency signals to the AOM 133R, 133G, and 133B, respectively. As a result, recording laser beams are emitted from the AOM 133R, 133G, and 133B every pulse cycle to of each of the exposure amount control signals by the time corresponding to the pulse width d and are combined together by the dichroic mirrors 134G and 134B and made incident on the polygon mirror 126.

The position on the photographic printing paper 112 at which laser beam is irradiated is sequentially displaced by the rotation of the polygon mirror 126, and the pulse cycle to of the exposure amount control signal is set so that an amount of displacement of the position at which laser beam is irradiated in the pulse cycle to corresponds to an interval of pixels of an image to be recorded on the photographic printing paper 112. Accordingly, the time of the laser beam being irradiated varies every pixel by the pulse width d, and therefore, an exposure amount is changed for each pixel in accordance with the exposure amount data. The laser beam reflected by the polygon mirror 126 is reflected by the mirrors 130 and 140 and irradiated on the photographic printing paper 112, and exposure for one row of pixels (that is, for one line) onto the photographic printing paper 112 is performed by one scan of laser beam by the polygon mirror 126.

When exposure for one line is performed, the process proceeds to step 408, in which the photographic printing paper 112 is conveyed by the pulse motor 144 by a predetermined amount corresponding to the distance of one line until the rotational angle of the polygon mirror 126 is set so that incident laser beam is reflected thereby to a scan start position. In the subsequent step 410, it is determined whether exposure for one image has been completed. When the decision of step 410 is made negative, the process returns to step 406, in which an exposure amount control signal according to exposure amount data corresponding to the next one line is outputted to each of the AOM drivers 120R, 120G, and 120B and exposure for the next one line is performed in the same way as the aforementioned.

By repeating the operation of steps 406 to 410 a predetermined number of times, exposure of an image corresponding to the exposure amount data is performed. When exposure processing for one image has been completed, the decision of step 410 is made affirmative and the process proceeds to step 412. In step 412, it is determined whether exposure for all of transferred exposure data has been completed. When the decision of step 412 is made negative, the process returns to step 402 and exposure processing for a subsequent image is performed in the same way as the aforementioned. When the decision of step 412 is made affirmative, in step 414, the rotation of the polygon mirror 126 is stopped, and thereafter, the exposure control processing ends.

The photographic printing paper 112 having been subjected to the exposure control processing is rewound into the magazine 114 after an unexposed portion thereof has been cut off in the cutter section 116, and a portion at which an image is exposed is subjected to various processing including color development, bleach-fixing, washing, and drying while being conveyed into various processing tanks of the processor section 154 and thereafter being conveyed in the drying section 166. An image exposed in the printer section 110 is made visible. The photographic printing paper 112 having been subjected to drying is cut off every image frame and discharged outside the printer processor 18.

As described above in detail, in the film image reading apparatus according to the present embodiment, the loop is provided between the pre-scan section and the fine scan section so as to eliminate the difference in the processing speed between these scan sections, and therefore, respective operations in the pre-scan section and the fine scan section can be performed independently. Further, it is possible to reduce the time the operation in one of the scan sections is stopped due to reasons of another section, thereby resulting in an image reading cycle being shortened and the speed at which an image is read being made higher.

In the film image reading apparatus according to the present embodiment, based on image data obtained by the pre-scan section (that is, density value data), the position and size of a frame image are detected. Accordingly, a photometric region in fine scan can be determined prior to fine scan without adversely affecting the time of an image reading cycle within the time the negative film is conveyed, and as a result, the image reading speed can be made higher.

Further, in the film image reading apparatus according to the present embodiment, a frame number and a DX code are detected based on image data obtained by the pre-scan section, and therefore, it is not necessary to provide a sensor for detecting them, or the like, thereby resulting in reduction in the cost of the apparatus.

Moreover, in the film image reading apparatus according to the present embodiment, a determination of an undesired frame image is made based on image data obtained by the pre-scan section, and fine scan is not performed for the undesired frame image. Accordingly, an overall image reading speed can be made higher.

Still further, in the film image reading apparatus according to the present embodiment, inspection of a positive image is performed based on image data obtained by the pre-scan section, and therefore, correction for image data, and the like can be made within the time the negative film is conveyed without adversely affecting the time of an image reading cycle. As a result, the image reading speed can be made higher.

The present embodiment was described in a case in which various processing including: detection of the position of a frame image; detection of the size of a frame image; detection of a DX code; detection of a frame number; a determination made as to whether a frame image to be read is an undesired one; determination of a photometric condition of fine scan; automatic setup processing; and inspection of a positive image is all performed. However, the present invention is not limited to the same, and a mode in which at least one of the aforementioned various processing be performed may be applied.

Further, in the present embodiment there was described a case in which conversion by which characteristics of image data obtained by the pre-scan section 36 substantially coincide with those of image data obtain ed by the fine scan section 38 is performed using a look-up table obtained in advance by an experiment or the like, but the present invention is not limited to the same. For example, there may be applied a mode in which the conversion be performed by using a 3×3 matrix which is obtained in advance by an experiment or the like and provided so that the characteristics of the image data by pre-scan substantially coincide with those of image data obtained by fine scan by a 3×3 matrix calculation.

Figure 11:
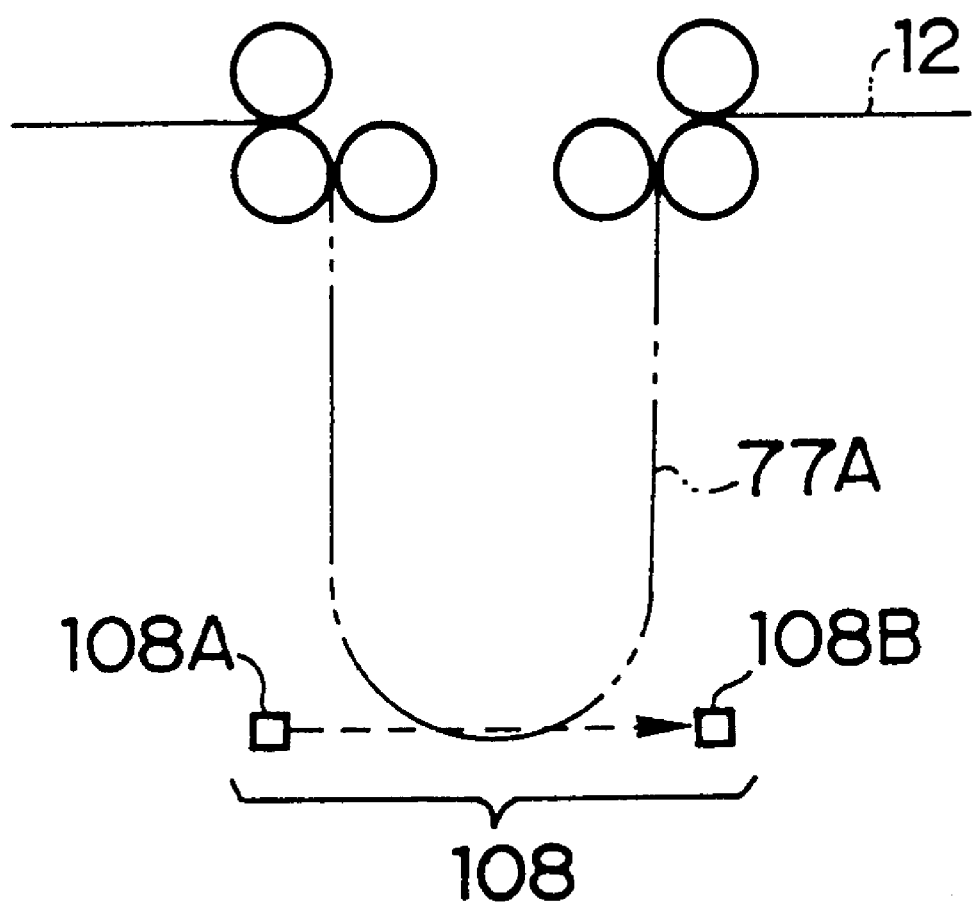
FIG. 11 is a schematic structural diagram which shows a form of loop management different from that of the present embodiment.

Moreover, in the present embodiment, there was described a case in which management of a loop is performed by detecting the length of a loop based on signals from loop managing sensors which are disposed in vicinities of a starting end point and a terminal end point of a loop provided between the pre-scan section 36 and the fine scan section 38, but the present invention is not limited to the same. For example, there also may be applied a mode for management of the loop in which, as shown in FIG. 11, a film detecting sensor 108 comprised of a light emitting element 108A and a light receiving element 108B is provided in the vicinity of an allowable lower end position of the loop, and based on change of the level of a signal outputted from the light receiving element 108B, a determination is made as to whether the loop has reached the allowable lower end position.

Still further, in the present embodiment, there was described a case in which, as an image sensor in each of the pre-scan section 36 and the fine scan section 38, a CCD sensor comprised of a plurality of sensor units each including a sensor for detecting an amount of light of R, a sensor for detecting an amount of light of G, and a sensor for detecting an amount of light of B, which sensors are adjacently arranged, is used. However, the present invention is not limited to the same and there may also be applied a mode in which an R-light CCD sensor formed by a plurality of sensors for detecting an amount of light of R, a G-light CCD sensor formed by a plurality of sensors for detecting an amount of light of G, and a B-light CCD sensor formed by a plurality of sensors for detecting an amount of light of B are used.

Figure 12:
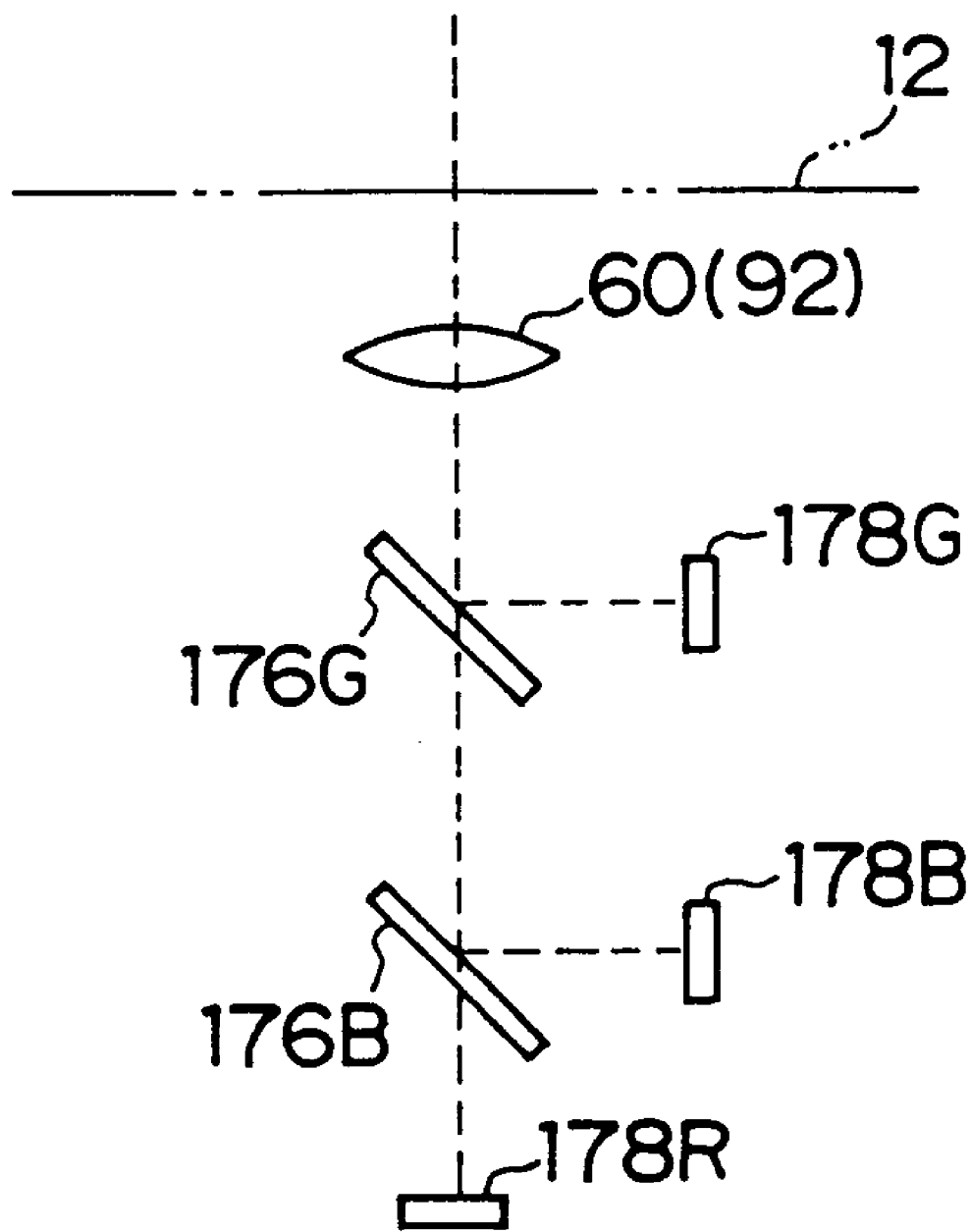
FIG. 12 is a diagram which schematically shows a structure of a photometric system (in each scan section) different from that of the present embodiment.

In this case, the structure in the periphery of the CCD sensor in each of the pre-scan section 36 and the fine scan section 38 is for example, shown in FIG. 12. Namely, a dichroic mirror 176G by which only light having a wavelength of G is reflected, a dichroic mirror 176B by which only light having a wavelength of B is reflected, and an R-light CCD sensor 178R are sequentially disposed in a direction in which light is emitted from the imaging lens 60 (in the fine scan section 38, the imaging lens 92), and further, a G-light CCD sensor 178G is disposed in a direction in which light is reflected by the dichroic mirror 176G and a B-light CCD sensor 178B is disposed in a direction in which light is reflected by the dichroic mirror 176B. Due to the structure thus provided, light of R is detected by the R-light CCD sensor 178, light of G is detected by the G-light CCD sensor 178G, and light of B is detected by the B-light CCD sensor 178B.

In the present embodiment, there was described a case in which an amount of exposure is measured for each pixel, and scan exposure is performed for each pixel in the printer section 110. However, the present invention is not limited to the same and can also be applied to analog exposure frequently employed by a normal printer.

Further, in the present embodiment, there was described a case in which the splice tape 174 is used as a mark for detecting a loop length, but the present invention is not limited to the same. There can be used any mark which can be detected as the same mark by two loop managing sensors. For example, when a bar code which indicates a film identification is provided at one predetermined position on the negative film 12, the bar code can also be used.

Moreover, in the present embodiment, there was described a case in which a negative film is used as the photographic photosensitive material of the present invention, but the present invention is not limited to the same. The present invention can of course be applied to the reading a reversal film (that is, positive film).

What is claimed is:

1. An image reading apparatus comprising:
   a conveying device for conveying a photographic photosensitive material on which an image is recorded so that the image passes sequentially through a first reading position and a second reading position;
   a first photometric system which reads the image at the first reading position and outputs the image as image data;
   a second photometric system which reads the image at the second reading position under photometric conditions determined on a basis of image data outputted from said first photometric system, and outputs the image as image data;
   a loop region provided on a conveying path along which the photographic photosensitive material is conveyed by said conveying device and between said first photometric system and said second photometric system, the loop region being provided to form a loop in the photographic photosensitive material; and
   a control device which effects control such that said first photometric system and said second photometric system operate independently in a state in which a length of the loop of the photographic photosensitive material in the loop region is within a predetermined range.

2. An image reading apparatus according to claim 1, wherein said control device detects a predetermined mark on the photographic photosensitive material at a starting end portion of the loop region, and thereafter, detects the predetermined mark at a terminal end portion of the loop region to thereby obtain an amount by which the photographic photosensitive material is conveyed from the starting end portion to the terminal end portion, and based on the amount by which the photographic photosensitive material is conveyed, said control device detects a length of the loop of the photographic photosensitive material in the loop region.

3. An image reading apparatus according to claim 2, wherein the predetermined mark is a splice tape used to connect a plurality of the photographic photosensitive materials.

4. An image reading apparatus according to claim 1, wherein on the basis of the image data outputted from said first photometric system, said control device performs at least one of detection of a position of the image, detection of a size of the image, detection of a DX code when a DX code is applied to the photographic photosensitive material, detection of a frame number when a frame number is given to the photographic photosensitive material, a determination as to whether the image is an undesired image, a determination of photometric conditions under which said second photometric system reads the image, a determination of processing conditions of image processing for image data outputted from said second photometric system, and image inspection.

5. An image reading apparatus according to claim 4, wherein when said control device carries out at least one of the determination of photometric conditions under which said second photometric system reads the image and the image inspection, said control device uses the image data outputted from said first photometric system, which has been converted such that characteristics of the image data outputted from said first photometric system become substantially identical to characteristics of the image data outputted from said second photometric system.

6. An image reading apparatus according to claim 5, wherein said conversion is effected by at least one of a look-up table and matrix calculation.

7. An image reading apparatus according to claim 4, wherein in a case in which said control device makes a determination as to whether the image is an undesired image on the basis of the image data outputted from said first photometric system and said control device determines that the image is an undesired image, said control device effects control so as not to allow reading of the image by said second photometric system.

8. An image reading apparatus according to claim 1, wherein said first photometric system reads an image at a speed which is higher than a speed at which the image is read by said second photometric system.

9. An image reading apparatus according to claim 8, wherein when the length of the loop of the photographic photosensitive material in said loop region is greater than a predetermined range, said control device effects control such that photometric processing by said first photometric system stops and photometric processing by said second photometric system continues.

10. An image processing system comprising:
    an image reading apparatus according to claim 1; and
    an image forming apparatus which forms an image based on image data obtained by reading an image using said image reading apparatus.

11. An image reading method comprising:
    a photographic photosensitive material on which an image is recorded is conveyed so that the image passes sequentially through a first reading position and a second reading position; and when image reading for determining photometric conditions in a second photometric system is performed at the first reading position by a first photometric system, and image reading based on the photometric conditions is performed by the second photometric system at the second reading position, a loop is formed in the photographic photosensitive material on a conveying path of the photographic photosensitive material and between the first photometric system and the second photometric system, and the first and second photometric systems are controlled so as to operate independently in a state in which a length of the loop is within a predetermined range.

12. An image reading method according to claim 11, wherein when the first photometric system and the second photometric system, are controlled so as to operate independently in a state in which the length of the loop is within the predetermined range, a predetermined mark on the photographic photosensitive material is detected at a starting end portion of a loop region, and thereafter, the predetermined mark is detected at a terminal end portion of the loop region to thereby obtain an amount by which the photographic photosensitive material is conveyed from the starting end portion to the terminal end portion, and based on the amount by which the photographic photosensitive material is conveyed, the length of the loop of the photographic photosensitive material in the loop region is detected.

13. An image reading method according to claim 12, wherein the predetermined mark is a splice tape used to connect a plurality of the photographic photosensitive materials.

14. An image reading method according to claim 11, wherein on a basis of the image data outputted from said first photometric system, at least one of detection of a position of the image, detection of a size of the image, detection of a DX code when a DX code is given to the photographic photosensitive material, detection of a frame number when a frame number is given to the photographic photosensitive material, a determination as to whether the image is an undesired image, a determination of photometric conditions under which said second photometric system reads the image, a determination of processing conditions of image processing for image data outputted from said second photometric system, and image inspection is performed.

15. An image reading method according to claim 14, wherein when at least one of the determination of photometric conditions under which said second photometric system reads the image and the image inspection is performed, image data outputted from said first photometric system, which has been converted such that characteristics of the image data outputted from said first photometric system become substantially identical to characteristics of the image data outputted from said second photometric system, is used.

16. An image reading method according to claim 15, wherein said conversion is effected by at least one of a look-up table and matrix calculation.

17. An image reading method according to claim 14, wherein in a case in which a determination is made as to whether the image is an undesired image on the basis of the image data outputted from said first photometric system and it is determined that the image is an undesired image, control is effected such that reading of the image by said second photometric system is not performed.

18. An image reading method according to claim 11, wherein said first photometric system reads an image at a speed which is higher than a speed at which the image is read by said second photometric system.

19. An image reading method according to claim 18, wherein when the length of the loop of the photographic photosensitive material in said loop region is greater than a predetermined range, control is effected such that photometric processing by said first photometric system is stopped and photometric processing by said second photometric system continues.

20. An image processing method comprising:

a photographic photosensitive material on which an image is recorded is conveyed so that the image passes sequentially through a first reading position and a second reading position; and when image reading for determining photometric conditions in a second photometric system is performed at the first reading position by a first photometric system, and image reading based on the photometric conditions is performed by the second photometric system at the second reading position, a loop is formed in the photographic photosensitive material on a conveying path of the photographic photosensitive material and between the first photometric system and the second photometric system, and a first and second photometric systems are controlled so as to operate independently in a state in which the length of the loop is within a predetermined range, and an image is formed on the basis of image data obtained by reading an image by the image reading of the second photometric system.

21. An image reading apparatus according to claim 1, wherein said control device controls said first photometric system and said second photometric system independently of one another such that an operation of said first photometric system is determined based on the length of the loop being kept within the predetermined range.

* * * * *